United States Patent [19]

Focqueur

[11] Patent Number: 4,532,768
[45] Date of Patent: Aug. 6, 1985

[54] VALVE DEVICE FOR A HYDRAULIC CIRCUIT

[75] Inventor: Hervé Focqueur, Franconville, France

[73] Assignee: Valeo, Paris, France

[21] Appl. No.: 468,635

[22] Filed: Feb. 22, 1983

[30] Foreign Application Priority Data

Mar. 3, 1982 [FR] France .............................. 82 03485

[51] Int. Cl.³ ........................ F15B 7/08; F16K 25/02
[52] U.S. Cl. ....................................... 60/585; 60/592; 137/519.5; 137/533.11
[58] Field of Search ................. 60/585, 592, 588, 589; 137/519.5, 533.11, 533.13, 533.15

[56] References Cited

U.S. PATENT DOCUMENTS

| | | | |
|---|---|---|---|
| 1,550,756 | 8/1925 | Sturtevant | 137/519.5 X |
| 2,283,695 | 5/1942 | Pratt et al. | 60/585 |
| 2,882,686 | 4/1959 | Griffith | |
| 3,106,226 | 10/1963 | Machen | 137/519.5 X |
| 3,596,564 | 8/1971 | Johnson | |
| 3,841,349 | 10/1974 | Todd | 137/519.5 X |
| 4,208,881 | 6/1980 | Brademeyer et al. | 60/592 X |
| 4,329,846 | 5/1982 | Gaiser | 60/589 X |
| 4,445,334 | 5/1984 | Derrick | 60/585 |

FOREIGN PATENT DOCUMENTS

| | | | |
|---|---|---|---|
| 2132557 | 1/1972 | Fed. Rep. of Germany | 60/585 |
| 740765 | 2/1933 | France . | |
| 773742 | 11/1934 | France . | |
| 1571313 | 12/1967 | France . | |
| 2480394 | 10/1981 | France . | |

Primary Examiner—Robert E. Garrett
Assistant Examiner—George Kapsalas
Attorney, Agent, or Firm—Young & Thompson

[57] ABSTRACT

A hydraulic valve device for a hydraulic circuit controlling clutches, brakes and similar mechanisms comprises a non-return valve provided between a tank and a chamber. The non-return valve incorporates a ball accommodated in a cylindrical cavity and interacting with a leak-proof seat located on the same side as the tank, and a permeable seat located on the same side as the chamber. This arrangement eliminates the risk of the hydraulic liquid in the tank overloading the circuit during abrupt depressurization of the circuit.

8 Claims, 5 Drawing Figures

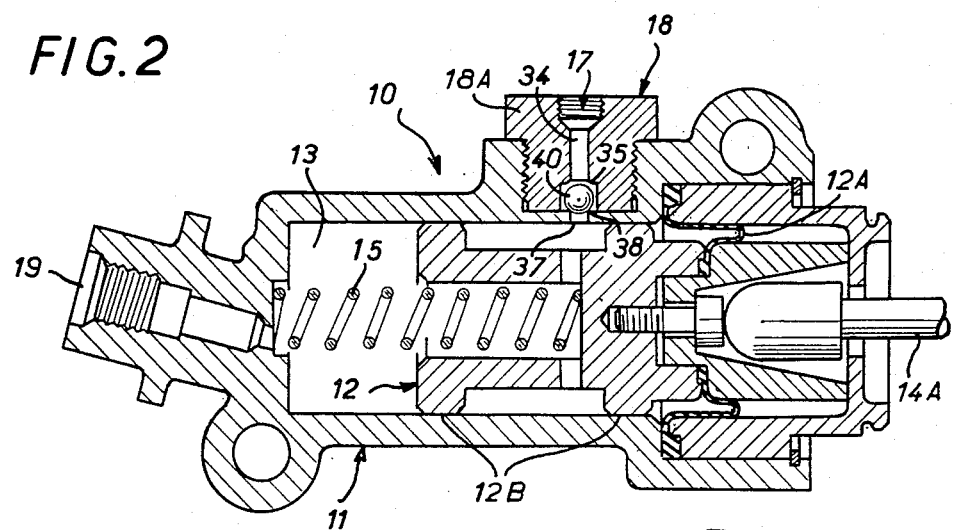
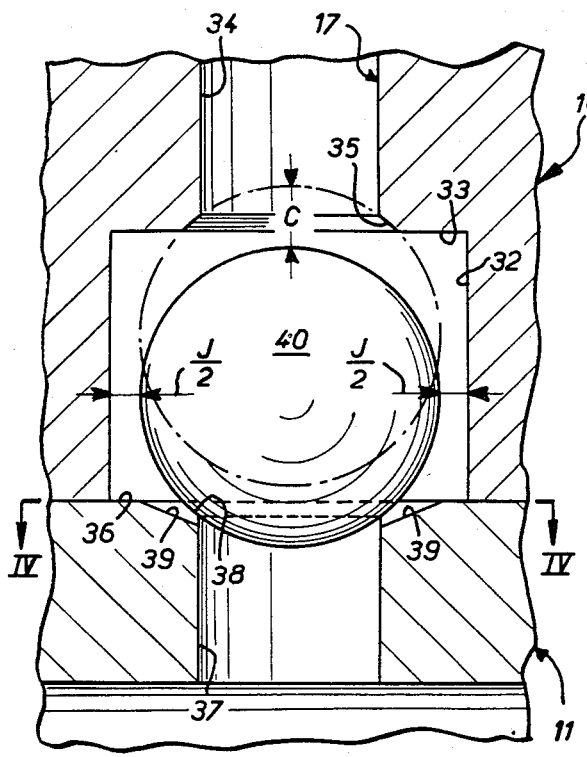
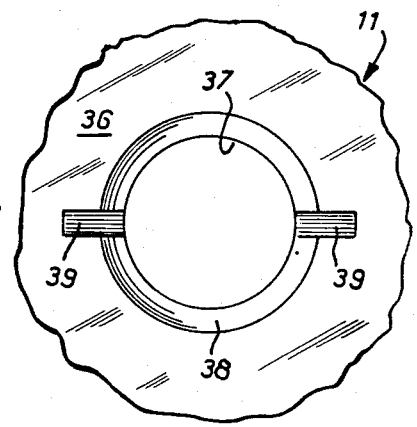
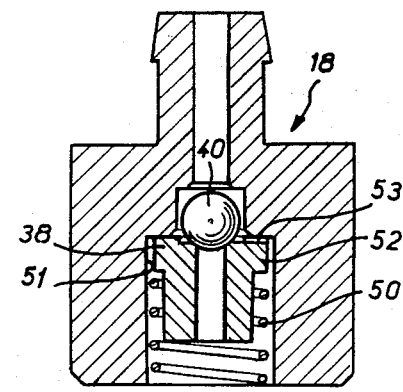

VALVE DEVICE FOR A HYDRAULIC CIRCUIT

BACKGROUND OF THE INVENTION

The present invention relates to a hydraulic valve device for a hydraulic circuit suitable for controlling clutches, brakes and other similar mechanisms, incorporating a cylinder, a piston mounted to slide in this cylinder and defining in it a chamber of variable volume connected to the hydraulic circuit, and a tank connected to the chamber by a passage having a non-return valve.

This tank is intended for replenishing the hydraulic circuit during operational conditions. The purpose of the non-return valve is to isolate the chamber from the tank when the piston is displaced in the direction of pressurization of the circuit and to ensure, in the position of rest, communication between the chamber and the tank.

However, in the return movement of the piston in which the chamber is depressurized, it is expedient to prevent liquid, drawn from the tank towards the chamber and prevented from returning to it during pressurization of the said chamber, from overloading the hydraulic circuit. Consequently, the non-return valve generally incorporates a stem which interacts in a pivoting manner with the piston, so as to provide a permanent two-way communication between the tank and the chamber when the piston is at rest or in a position adjacent to the position of rest.

FIELD OF THE INVENTION

The present invention relates especially to a hydraulic valve device of the kind referred to above, in which the non-return valve has a simpler construction than in these conventional arrangements and incorporates a simple ball free of any pivoting stem.

More particularly, the present invention relates to a hydraulic valve device of the kind referred to above, in which the passage between the chamber of variable volume and the tank is separate from the hydraulic circuit and comprises a cylindrical cavity which has at its end adjacent the tank an orifice coaxial with this cavity and surrounded by a leak-proof annular seat, whilst the non-return valve incorporates a ball which is engaged with a slight play in this cylindrical cavity and which is designed to abut the said leak-proof seat when the pressure of the chamber is greater than that of the tank.

Known constructions of this kind are generally subject to a risk of overloading of the hydraulic circuit by the liquid in the tank, particularly when the return movement of the piston is rapid.

The present invention provides a hydraulic valve device of this kind, in which this risk is eliminated, whilst having a simple and convenient construction and excellent operation.

SUMMARY

According to the invention, a hydraulic valve device of the kind referred to above is characterised in that said cavity incorporates, at its other end, i.e. the end adjacent the chamber, an orifice which is coaxial with the said cavity and which is surrounded by a permeable seat for the ball, this permeable seat having a reduced communication cross-section when the ball rests on it, whilst restoring means are provided to restore the ball to the said permeable seat.

It will be noted that the reduced communication cross-section of the permeable seat depends especially on the charge losses of the hydraulic circuit which also incorporates a receiver, and that the greater the charge losses, the more the cross-section must be reduced. It likewise depends on the pressure holding the ball against its leak-proof seat.

By means of this arrangement, the normal operation of the hydraulic valve device is in no way disturbed by the permeable seat, since the ball is exposed to the full free cross-section of the orifice which this permeable annular seat surrounds, thus allowing the non-return valve to be closed immediately when the piston is displaced in the direction of pressurization of the circuit. However, during a rapid return of the piston towards the position of rest, causing sudden depressurization of the chamber, the ball is attracted onto the permeable seat, on the one hand by the restoring means, and on the other hand as a result of depressurization, thus allowing communication to be made between the tank and the chamber more slowly, and avoiding any risk of overloading of the hydraulic circuit by the liquid in the tank. This is achieved with an extremely simple construction with more reliable operation, and with a better response time and less friction than that of a non-return valve which would be provided, in a conventional way, with a pivoting stem ineracting with the piston.

In an embodiment of the invention, the permeable annular seat comprises a continuous surface interrupted by radial grooves. If appropriate, the continuous surface of the permeable annular seat may be free of radial grooves, and communication of reduced cross-section would then be made directly between the cylindrical cavity, on the one hand, and the chamber of variable volume of the hydraulic valve device on the other hand, by means of a branch channel of reduced cross-section.

The play of the ball in the cylindrical cavity, which depends especially on the hydraulic circuit, is diametrically of the order of one to six tenths of a millimetre, whilst the travel of the ball between the two seats is itself approximately double this value.

BRIEF DESCRIPTION OF THE DRAWINGS

FIG. 2 is a view of this master cylinder in a longitudinal section on a larger scale;

FIG. 3 is a sectional view of the non-return valve on an even larger scale;

FIG. 4 is a corresponding view according to the arrows IV—IV of FIG. 3;

FIG. 5 shows an alternative embodiment.

DETAILED DESCRIPTION OF THE PREFERRED EMBODIMENTS

Figure 1:
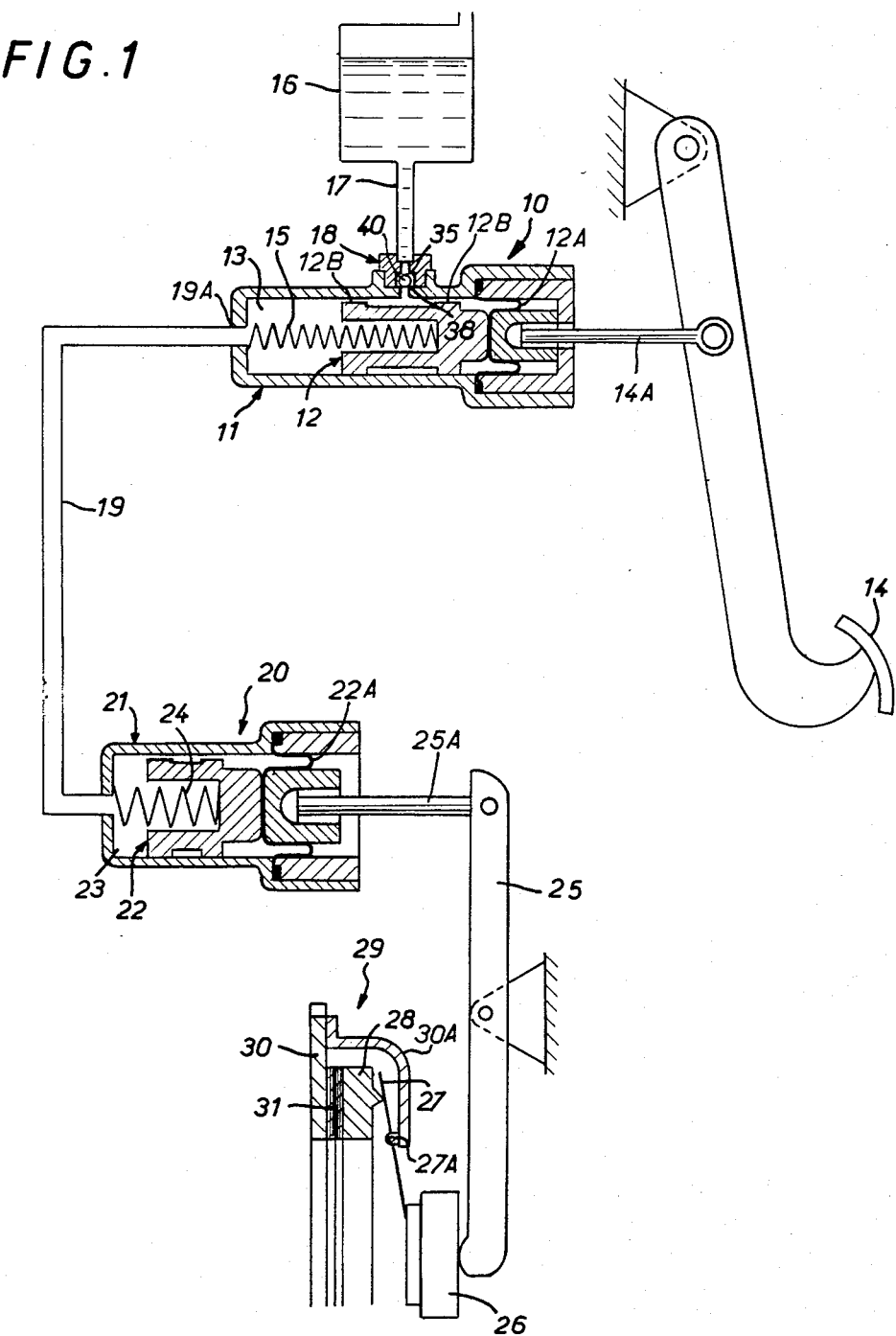
FIG. 1 is a diagram of a hydraulic circuit for actuating a clutch, incorporating a master cylinder provided with a non-return valve according to the invention.

In the embodiment illustrated in FIGS. 1 to 4, which relate by way of non-limiting example to the application of the invention to a hydraulic circuit for controlling the clutch of a motor vehicle, a master cylinder for this hydraulic circuit may be seen in FIG. 1 at 10.

The master cylinder 10 comprises a cylinder 11 and a piston 12 mounted to slide in the cylinder 11 and defining in this cylinder 11 a chamber 13 of variable volume. In this embodiment, the piston 12 is connected to the cylinder 11 of the master cylinder 10 by an elastically deformable diaphragm 12A which closes the said chamber of variable volume in a leak-proof manner and which is moreover, provided transversely with at least one annular guide bearing 12B, of which there are two here, the said portion being located within the said chamber.

The piston 12 is driven by control means, comprising a clutch pedal 14, and a rod 14A.

In an alternative form (not shown), the control means comprise a power-assistance device located between the piston 12 and the clutch pedal and actuated by the pedal.

The piston 12 tends to be restored into the position of rest up against the body of the cylinder (shown in FIG. 1) by a spring 15.

The hydraulic circuit also incorporates a tank 16 connected to the chamber 13 by a passage 17, vertical here, having a non-return valve 18. The said tank can be integrated in the master cylinder 10 or can be separate from it. When the pedal 14 is pressed to pressurize the chamber 13, the non-return valve 18 makes it possible to prevent the liquid in the chamber 13 from flowing back towards the tank 16.

The master cylinder 10 constitutes a transmitter for a hydraulic conduit 19 which is connected to the chamber 13 by an orifice 19A and which incorporates a receiver 20.

The receiver 20 comprises a cylinder 21 in which a piston 22 is engaged to slide. The piston 22 defines in the cylinder 21 a chamber 23 of variable volume which is connected to the pipe 19.

In the same way as for the transmitter, the chamber 23 is closed in a leak-proof manner by a diaphragm 22A connecting the piston 22 to the cylinder 21, the said piston likewise incorporating transversely at least one annular guide bearing, two in this embodiment, located within the said chamber 23.

The piston 22 is provided with a restoring spring 24 and is designed to actuate a clutch disengagement fork 25 by means of a rod 25A. This clutch disengagement fork 25 interacts with a clutch disengagement thrust-bearing 26 which, when it is actuated, is designed to release the elastic clamping action of an elastic diaphragm 27 on a pressure plate 28 of a clutch 29, a reaction plate of which may be seen at 30 and a friction disc of which may be seen at 31. The means for pivoting the diaphragm 27 on a cover 30A fixed to the plate 30 are indicated diagrammatically at 27A.

When the hydraulic circuit 19 is depressurized, the fork 25 is not actuated, and the elastic diaphragm 27 ensures that the disc 31 is clamped between the plates 28 and 30. The clutch is engaged.

When the hydraulic circuit 19 is pressurised, the piston 22 pushes on the fork 25 which, in turn, pushes on the thrust-bearing 26. The latter releases the clamping action of the elastic diaphragm 27 on the plate 28. The disc 31 is released from between the plates 28 and 30. The clutch is disengaged.

The passage 17 is separate from the orifice 19A connecting the chamber 13 to the pipe 19, and connects the tank 16 to the chamber 13. The passage 17 receives the non-return valve 18 and incorporates (FIGS. 2 to 4) a cylindrical cavity 32.

The non-return valve 18 incorporates a ball 40 which is engaged with a slight play in the cylindrical cavity 32.

The cylindrical cavity 32 has, at its end 33 adjacent to the tank 16, an orifice 34 coaxial with the cavity 32 and surrounded by a leak-proof annular seat 35 having an uninterrupted continuous annular surface.

The cavity 32 incorporates, at its other end 36 which is adjacent to the chamber 13 of the master cylinder 10, an orifice 37 coaxial with the cavity 32 and aligned with the orifice 34. The orifice 37 is surrounded by an annular seat 38. The seat 38 which has a continuous surface is made permeable because this continuous surface is interrupted by radial grooves 39. Here, the grooves 39 are inclined and can be produced simply by moulding.

In alternative form (not shown), the seat 38 can be free of radial grooves, a branch channel separate from the orifice 37 then being provided between the end 36 and the chamber of variable volume 13 in such a position that the ball 40 cannot shut off the said channel when it is up against the seat 38, so that the said seat becomes permeable.

Of course, the cross-section of the orifice 37 can be equal to or different from that of the orifice 34, whilst being less than the cross-section of the cavity 32.

The ball 40 is designed to come up against the leak-proof seat 35 when the pressure in the chamber 13 is greater than that in the tank 16.

Restoring means are provided for restoring the ball 40 onto the permeable seat 38. In the example illustrated in FIGS. 1 to 4, these restoring means consist of the simple gravitational force of the ball 40 which, as a result of its own weight, tends to descend on to the permeable seat 38 located underneath the ball 40. Alternatively, the restoring means can comprise a spring (not shown), especially when the cavity 32 is not arranged vertically.

The ball 40 is designed to abut the permeable seat 38 when the pressure in the chamber 13 is less than or near to that in the tank 16, bearing in mind restoring means and the pressure difference between the chamber 13 and the tank 16.

In this case, the permeable seat 38 has, because of the grooves 39, a reduced flow cross-section, here, for example, of the order of 1% to 10% of the cross-section of the orifice 37, depending especially on the charge losses in the circuit and the relative speeds of the pistons 12 and 22.

It will be seen in FIG. 3 that the ball 40 is spaced from the side wall of the cylindrical cavity 32 by a radial play J/2 which gives rise to a diametral play J. This diametral play J is advantageously of the order of one to six tenths of a millimetre. The travel C of the ball 40 between the two seats 35 and 38 is of the order of double the said diametral play J of the ball 40 in the cavity 32.

When the pedal 14 is pressed to disengage the clutch, the piston 12 penetrates into the cylinder 11 and pressurizes the entire circuit 13, 19 and 23, the chamber 13 being reduced in volume whilst the chamber 23 increases in volume.

The pressure in the chamber 13 becomes greater thant the pressure in the tank 16, and, because of the full cross-section of the orifice 37, pushes the ball 40 back against the leak-proof seat 35. Thus, all the pressure remains available in the chamber 13 to pressurize the chamber 23

When the pedal 14 is released to allow the clutch 29 to re-engage, the pressure diminishes in the chamber 13, the volume of which increases. If this pressure becomes equal to or less than that in the tank 16, disregarding the restoring means, the ball 40 is allowed to fall onto the permeable seat 38, thus making it possible to provide communication between the tank 16 and the chamber 13.

If the action of releasing the pedal 14 is abrupt, which can cause a partial vacuum effect in the chamber 13, bearing in mind especially that the backward flow of the liquid from the receiver 20 to the transmitter 10 is retarded as a result of charge losses and as a result of the relative speeds of the pistons 22 and 12, the liquid in the tank 16 is nevertheless prevented from spilling excessively into the chamber 13 because the ball 40 up against the permeable seat 38 leaves only reduced communication cross-section at 39.

It will be noted that the greater the said charge losses, the higher the vacuum and the more the passage cross-section presented by the grooves 39 must be reduced. For this purpose, the number of grooves or their dimensions can be adjusted.

Consequently, the circuit 19 does not risk being overloaded with liquid, since the passage cross-section presented by the grooves 39 is determined in such a way that, the piston 12 having returned to its fixed position of rest, the additional volume poured into the chamber 13 has at the outset a residual pressure in the circuit which is below the pressure holding the ball against its leak-proof seat 35. Under these conditions, the ball allows the overspill of liquid to flow towards the tank 16 again. It will also be noted that, when the piston is in the position of rest, the said passage cross-section allows filling of the hydraulic circuit under good conditions, especially bearing in mind the wear of the linings of the friction disc 31, or of the brake blocks if a hydraulic circuit for controlling brakes is concerned.

The especially simple construction of the non-return valve according to the invention and the great ease with which it can be modified will be appreciated. For example, whereas in the embodiment described and illustrated the non-return valve is integrated in the master cylinder as a result of the screwing of a component 18A incorporating the cavity 32 and the orifice 34, it is possible, especially when the tank is distant from the master cylinder, to arrange the non-return valve in the vicinity of the said tank or in the piping connecting the said tank to the said master cylinder, this being possible even in a horizontal position, in which case a restoring spring is necessary.

Of course, the present invention is not limited to the embodiment described and illustrated, but embraces all alternative forms.

It is possible (FIG. 5) to envisage mounting the seat 38 of the ball 40 so as to be movable against the action of a precalibrated spring 50.

By means of this arrangement, a substantial flow of liquid from the top downwards in FIG. 5 is made possible by the valve.

The liquid enters the valve 18 at the top under pressure and pushes the ball 40 back against the lower seat 38 in a translational movement downwards counter to the precalibrated spring 50.

The through-flow is improved, the passage surface being represented by the cross-sectional differences between the bore 51 and the washer 52, by the radial channels 53, on the one hand, and by the cross-sectional difference between the ball 40 and the bore 51, on the other hand.

I claim:

1. A hydraulic valve device for a hydraulic circuit, comprising a cylinder, a piston mounted to slide in said cylinder and defining therein a chamber of variable volume for connection to the hydraulic circuit, control means for controlling the displacement of said piston, and a tank connected to said chamber by a passage having a non-return valve, wherein said passage is separate from the hydraulic circuit and incorporates a cylindrical cavity which has at its end adjacent said tank an orifice coaxial with said cavity and surrounded by a leak-proof seat, said nonreturn valve incorporating a ball which is engaged with a slight play in said cylindrical cavity and operable to abut said leakproof seat when the pressure in the chamber is greater than that in the tank, and wherein said cavity incorporates, at its end adjacent said chamber, an orifice which is coaxial with the cavity and which is surrounded by a permeable seat for said ball, this permeable seat having a very substantially reduced communication cross-section when said ball is in engagement therewith, said reduced communication cross-section being operative to limit the flow of hydraulic fluid from the tank to the chamber in case of a negative pressure produced in the chamber by a sudden release of said control means, and restoring means for biasing said ball to said permeable seat.

2. A hydraulic valve device according to claim 7, wherein said restoring means comprise gravity acting on said ball.

3. A hydraulic valve device according to claim 1, wherein said restoring means comprise a spring.

4. A hydraulic valve device according to claim 1, wherein the reduced flow cross-section of the permeable seat is of the order of 1% to 10% of the cross-section of the orifice surrounded by the permeable seat.

5. A hydraulic valve device according to claim 1, wherein the permeable annular seat incorporates a continuous surface interrupted by radialk grooves.

6. A hydraulic valve device according to claim 1, wherein the play of the ball in the cylindrical cavity is diametrically of the order of one to six tenths of a millimeter.

7. A hydraulic valve device according to claim 1, wherein the travel of the ball between the two seats is of the order of double said play.

8. A hydraulic valve device according to claim 1, wherein the permeable seat is mounted so as to be movable against the action of spring means.

* * * * *